(12) United States Patent
Liu et al.

(10) Patent No.: US 10,351,078 B2
(45) Date of Patent: Jul. 16, 2019

(54) MAGNETIC FASTENER

(71) Applicant: Ford Global Technologies LLC, Dearborn, MI (US)

(72) Inventors: Alvin Liu, Nanjing (CN); Cliff Ruan, Nanjing (CN); Kevin Shen, Nanjing (CN); Xuezhi Jin, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 43 days.

(21) Appl. No.: 15/839,659

(22) Filed: Dec. 12, 2017

(65) Prior Publication Data

US 2018/0170283 A1  Jun. 21, 2018

(30) Foreign Application Priority Data

Dec. 21, 2016  (CN) .......................... 2016 1 1189928

(51) Int. Cl.
*B60R 13/02* (2006.01)
*F16B 11/00* (2006.01)
*F16B 43/02* (2006.01)
*F16B 1/00* (2006.01)

(52) U.S. Cl.
CPC ...... *B60R 13/0206* (2013.01); *B60R 13/0212* (2013.01); *F16B 11/006* (2013.01); *F16B 43/02* (2013.01); *F16B 2001/0035* (2013.01)

(58) Field of Classification Search
CPC ............. Y10T 24/32; F16B 2001/0035; B60R 13/0212; B60R 13/0206

USPC .............................................. 296/214, 146.7
See application file for complete search history.

(56) References Cited

U.S. PATENT DOCUMENTS

| 7,306,190 | B2 | 12/2007 | Tisol, Jr. |
| 8,287,034 | B2 | 10/2012 | Smith et al. |
| 8,555,468 | B2 | 10/2013 | Moerke |
| 9,320,328 | B1 | 4/2016 | Sinclair |
| 2013/0185901 | A1* | 7/2013 | Heyman .............. A01K 27/005 24/303 |
| 2014/0001322 | A1 | 1/2014 | Joyce et al. |
| 2016/0040693 | A1 | 2/2016 | Popovski et al. |
| 2016/0068117 | A1 | 3/2016 | Huelke et al. |

FOREIGN PATENT DOCUMENTS

FR  2853027  * 10/2004  .............. F16B 21/06

* cited by examiner

*Primary Examiner* — Dennis H Pedder
(74) *Attorney, Agent, or Firm* — Vichit Chea; Kolitch Romano LLP

(57) ABSTRACT

The present application discloses a magnetic fastener. The magnetic fastener comprises a magnetic connector including a support bracket having a hole at a bottom; a bottom support including a base and a neck; and an elastic member. The neck extends from the base, passes through the hole of the support bracket, and is partially received in the support bracket. The support bracket is slidable relative to the neck, and the elastic member is disposed inside the support bracket and configured to connect the neck and the support bracket.

19 Claims, 3 Drawing Sheets

MAGNETIC FASTENER

RELATED APPLICATION

This application claims the benefit of Chinese Patent Application No.: CN 201611189928.4 filed on Dec. 21, 2016, the entire contents thereof being incorporated herein by reference.

FIELD

This invention generally relates to a magnetic fastener, particular relates to a magnetic fastener used to connect two parts in a vehicle.

BACKGROUND

A magnetic fastener is commonly used to connect two vehicle parts, such as securing a headliner to a roof of a vehicle. The two vehicle parts may not be parallel each other as desired due to a manufacturing tolerance. When the tolerance exceeds a certain range, or two surfaces of the parts are not parallel, the magnetic fastener may not contact the part substantially to maintain a desired connection. Further, the parts in different types of vehicles may be spaced apart each other with different distances. Thus, there is need for a magnetic fastener which can accommodate the variance on the tolerance and the space between the parts.

SUMMARY

According to one aspect, the present disclosure provides a magnetic fastener. The magnetic fastener includes a magnetic connector, a support bracket to hold the magnet, a bottom support to hold the magnetic connector, and an elastic member inside the support bracket. The support bracket includes a hole at a bottom. The bottom support includes a base and a neck extending from the base, passing through the hole of the support bracket. The neck is slidably connected to the support bracket and the elastic member is configured to connect the neck and the support frame.

In one embodiment, the elastic member includes a spring.

In another embodiment, the neck includes a stop at a distal end, and the elastic member includes a first end connected to the stop and a second end connected to the support bracket.

In another embodiment, an edge of the stop extend radially from the neck and has a first cross-sectional dimension and the hole of the support bracket has a second cross-sectional dimension less than the first cross-sectional dimension of the stop.

In another embodiment, the wall of the hole of the support bracket may have a clearance relative to the neck of the bottom support.

In another embodiment, the clearance may be in a range of about 0.2 mm to about 0.5 mm.

In another embodiment, the support bracket may be made from a permanent magnet.

In another embodiment, the support bracket may be made from ferromagnetic material and the magnetic connector further includes a magnet positioned on the support frame.

In another embodiment, the magnet may include a central hole to receive the neck of the bottom support.

According to another aspect, a magnetic fastener comprises a magnet, a ferromagnetic support bracket to hold the magnet and has a hole at a bottom, a bottom support to hold the support bracket, and a spring. The bottom support includes a base and a neck that extends through the hole of the support bracket. The neck is slidable in the opening, and includes a stop disposed inside the support bracket. The spring is disposed between the stop of the bottom support and the bottom of the support bracket along an extending direction of the neck, and the first end of the spring is connected to the stop and a second end of the spring is connected to the bottom support bracket.

In one embodiment, a wall forming the hole of the support bracket has a clearance relative to the neck.

In another embodiment, the support bracket has a bowl shape.

According to another aspect, a magnetic fastener in a vehicle comprises a magnet; a support bracket to hold the magnet and to be connected to a first vehicle part; a bottom support to hold the support bracket and an spring disposed inside the support bracket and extending at a height direction. The bottom support includes a base to be connected to a second vehicle part and a neck extending from the base. An upper surface of the support bracket or an upper surface of the magnet is to be connected to the first vehicle part. The neck of the base has a distal end, passes through a hole of the support bracket and is partially received in the support bracket. A first end of the spring is connected to the distal end of the neck and a second end of the spring is connected to the support bracket. The support bracket is slidably connected to the neck and moveable along the height direction of the neck.

In one embodiment, a wall defining the hole of the support bracket has a clearance relative to an outer edge of the neck, and the clearance is configured such that an outer surface of the support frame is capable of being inclined to a predetermined angle relative to an upper surface of the bottom support.

In another embodiment, the support bracket includes a magnet holding portion and a receiving portion between the magnet holding portion and the base of the bottom support. At least a portion of the spring and a portion of the neck is disposed in the receiving portion, and a cross sectional area of the opening of the magnet holding portion is greater than a cross sectional area of an opening of the receiving portion.

In another embodiment, the openings of the magnet holding portion and the receiving portion are circular, and the neck has a cylinder shape.

In another embodiment, a distal end of the neck includes a stop extending radially from the neck.

In another embodiment, the spring is a spiral spring and the neck is positioned inside the spring.

In another embodiment, the spring is a leaf spring.

In another embodiment, the first vehicle part is a metal roof panel and the second vehicle part is a headliner.

According to one or more embodiments of the present application, the spring and clearance in a magnetic fastener are configured to provide a dynamic equilibrium to firmly connect two vehicle parts with different spaces between their surfaces and can provide robust connection for two vehicle parts having surfaces having a certain angle relative each other.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more of the features or advantages of the present invention are apparent from one or more embodiments described in detail below, combining with the drawings.

DESCRIPTION OF DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed magnetic fasteners will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various magnetic fasteners are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
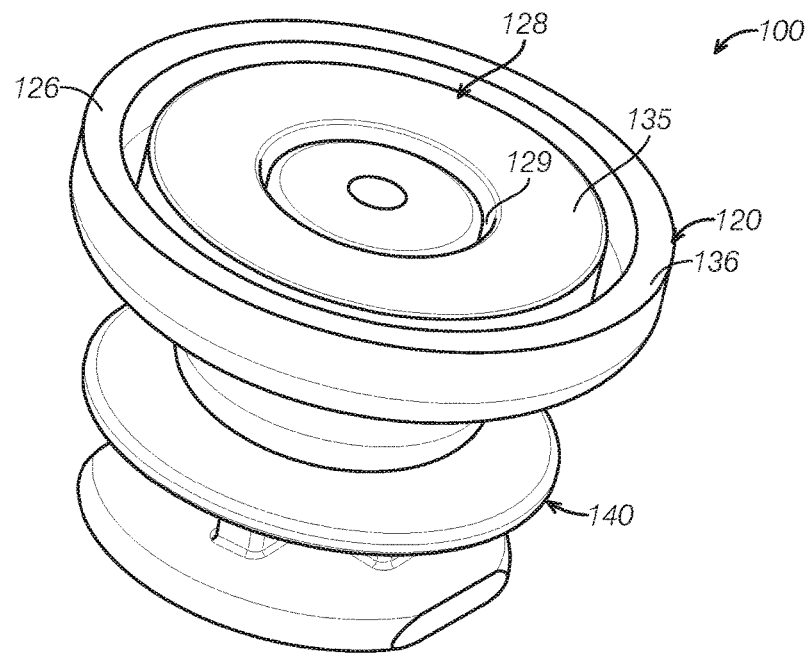
FIG. 1 is a perspective view of a magnetic fastener according to one embodiment of the present disclosure.
Figure 2:
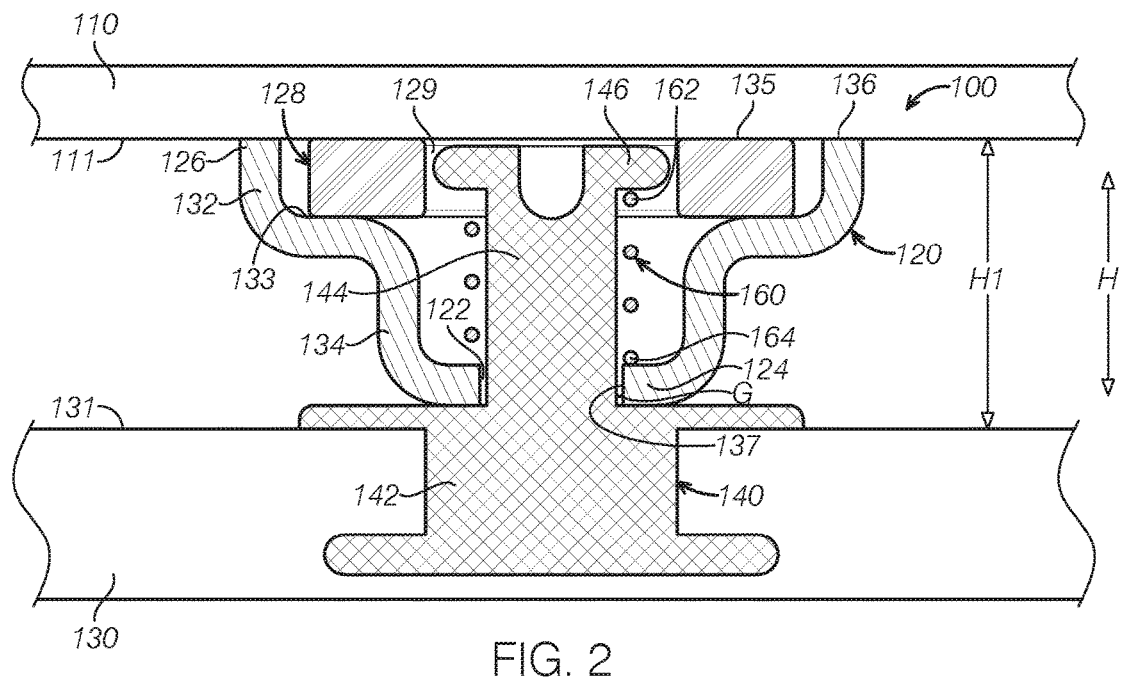
FIG. 2 is a cross sectional view of the magnetic fastener shown in FIG. 1, illustrating connections with a first vehicle part and a second vehicle part.
Figure 3:
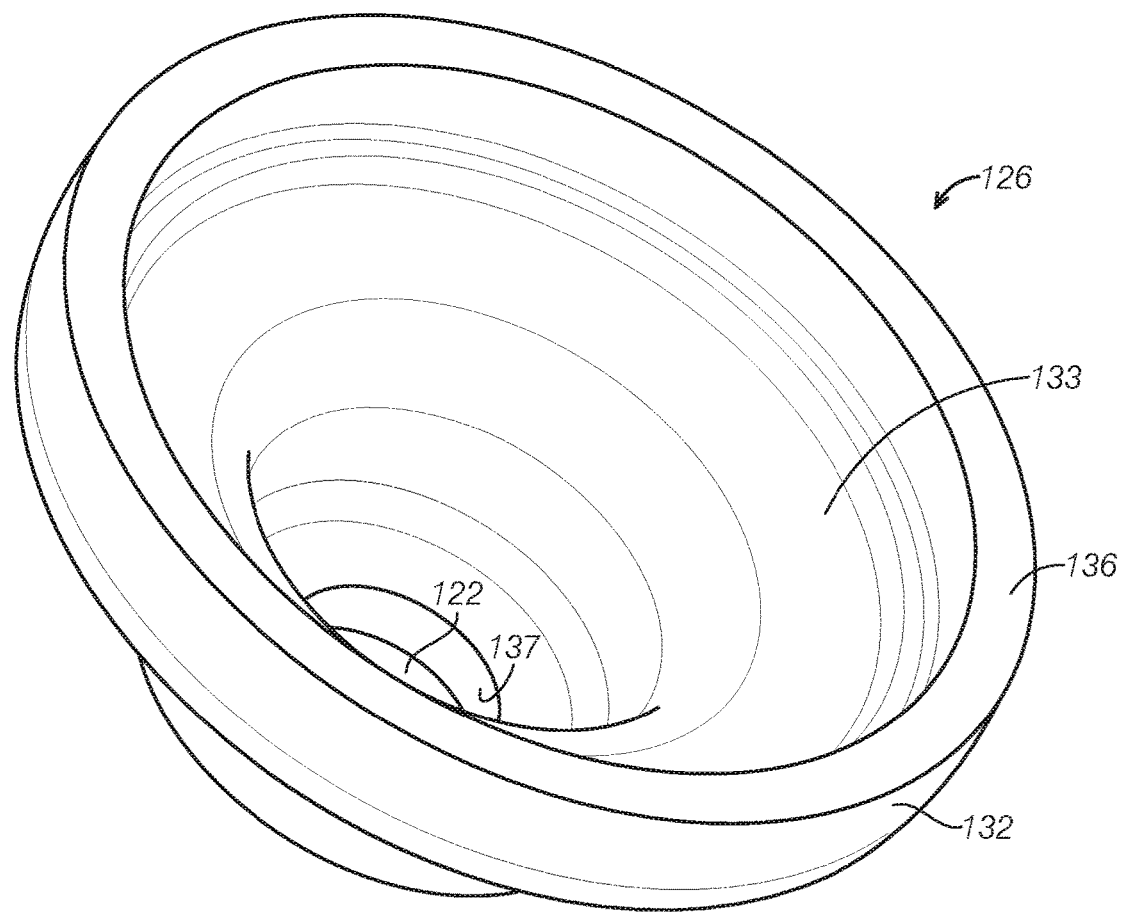
FIG. 3 is a perspective view of the support bracket of the magnetic fastener shown in FIG. 1.

FIGS. 1-3 schematically depict a magnetic fastener 100 according to one embodiment of the present disclosure. The magnetic fastener comprises a magnetic connector 120, a bottom support 140, and an elastic member 160. The magnetic connector 120 includes a support bracket 126 including a hole 122 at a bottom 124. In the embodiment depicted in FIGS. 1, 2, the magnetic connector 120 includes a support bracket 126 and a permanent magnet 128. In other embodiments, the magnetic connector 120 only includes a support bracket 126 consisting of a permanent magnet. The bottom support 140 includes a base 142 and a neck 144. The neck 144 extends from the base and passes the hole 122 of the support bracket 126, and slidably connects to the support bracket 126. In other words, the support bracket 126 is slidable relative to the neck 144. The elastic member 160 is disposed inside the support bracket and connected to the neck 144 and the support bracket 126.

Referring to FIG. 2, the magnetic fastener 100 is shown to connect a first vehicle part 110 and a second vehicle part 130. In one embodiment, the first vehicle part 110 may be a metal part, such as a metal roof panel of a vehicle, and the second vehicle part 130 may be a metal or non-metal part, such as a headliner or a frame connected to the headliner. For the illustration purpose, the vehicle headliner and vehicle roof panel/sheet metal are used as examples for the first and second vehicle parts. It should be understood that the magnetic fasteners of the present disclosure can be used to connect other vehicle parts such as a door panel and a door trim. Further, the magnetic fastener may be used in airplanes, ships, other devices such as home appliance and commercial devices.

The magnetic connector 120 of the magnetic fastener 100 may be connected to the first vehicle part via a magnetic connection. For example, an upper surface 136 of the support bracket 126 may contact a bottom surface 111 of the first vehicle part 110. As described below, in the embodiment wherein the magnetic connector includes a magnet 128, an upper surface 135 of the magnet 128 may rest, contacts, or substantially contact the bottom surface 111 of the first vehicle part 110. For the purpose of clarity, the bottom support 142 is shown to connect to the second vehicle part 130 directly. It should be understood that the base 142 may be connected directly or indirectly to the second vehicle part 130 via any appropriate connection such as snap-fit, adhesive connection, screw connection, nut/bolt and weld connection.

In one embodiment, the support bracket 126 of the magnetic connector 120 may be made from ferromagnetic material such as steel, and the magnetic connector 120 further includes a magnet 128 positioned on the support bracket 126. In some embodiments, the magnet 128 may have a high magnetic strength. For example, the magnet 128 may be a neodymium magnet.

Referring to FIGS. 2-3, the support bracket 126 may include a magnet holding portion 132 and a receiving portion 134. The receiving portion 134 may be positioned between the holding portion 132 and the base 142 of the bottom support 140 to receive at least portion of the elastic member 160 and the neck 144. A cross section of an opening of the magnet holding portion 132 is greater than a cross section of an opening of the receiving portion 134 such that a platform 133 is formed to hold the magnet 128.

In some embodiments, the magnet holding portion 132 has an annular cross section and is magnetically connected to the magnet 128. Similarly, the receiving portion 134 may have an annular cross section area. The cross-sectional area of the magnet holding portion 132 is greater than the cross-sectional area of the receiving portion 134. As the support bracket 126 is made from ferromagnetic material, the support bracket 126 is magnetized. Thus, the support bracket 126 may enhance the connection to the first vehicle part 110 and prevent the magnet 128 to move laterally. Such configuration is advantageous because the support bracket 126 have enhanced magnetic strength and the wear of the magnet 128 during assembling to the first vehicle part 110 can be reduced. Alternatively, in some embodiments, the magnetic connector 120 may consist of only the support bracket 126 made from permanent magnet.

Figure 4:
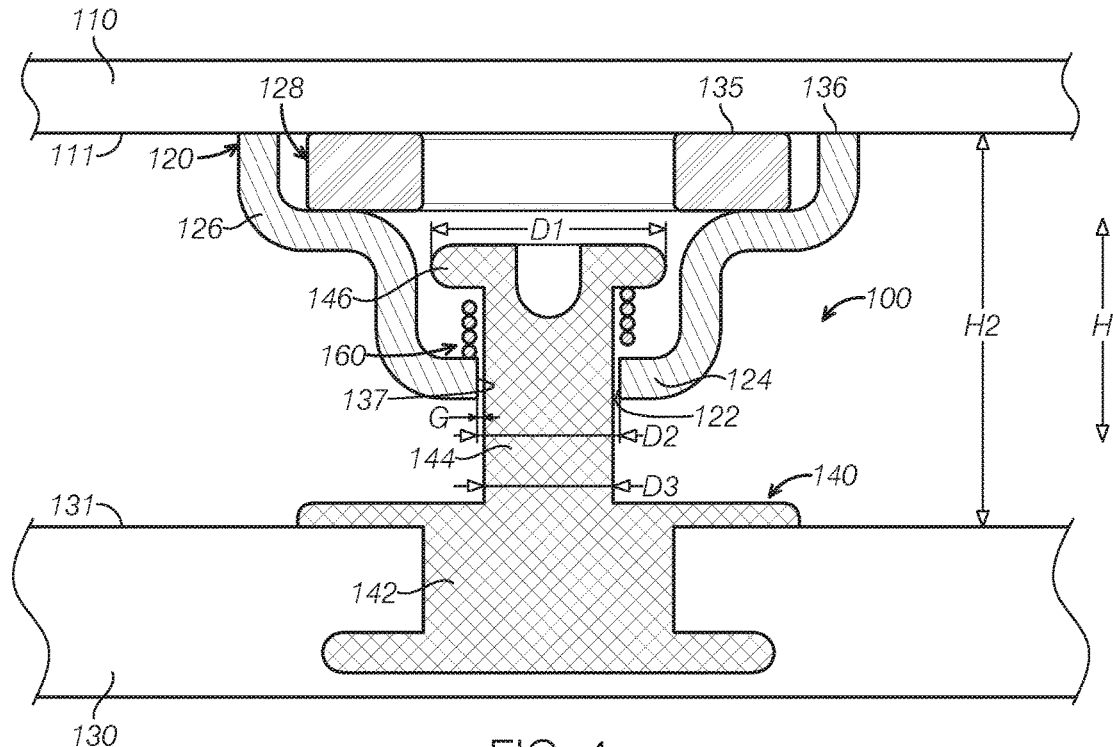
FIG. 4 is a cross sectional view of the magnetic fastener shown in FIG. 2, illustrate the magnetic fastener at a compressed position.

Referring to FIGS. 2 and 4, the neck 144 of the bottom support 140 extends up from the base 142 along a height direction H, and the bottom portion 124 of the support bracket 126 includes a hole 122 to receive the neck 144. Correspondingly, the magnet 128 includes a central hole 129 to receive the neck 144. In one embodiment, the neck 144 includes a distal end away from the base 142. The distal end includes a stop 146. As shown in the figures, the stop 146 may protrude radially outward from the neck 144, and the first stop 126 has a first cross-sectional dimension D1. The cross-sectional dimension is a width or a diameter of the stop 146. The hole 122 of the support bracket 126 has a second cross-sectional dimension D2, the D2<D1. As such, the stop prevents the neck 146 sliding out from the hole 122, when the elastic member 160 of the magnetic fastener 100 is at a compressed position.

In one embodiment, the stop 146 of the neck 144 has a third cross sectional dimension D3. The third cross sectional dimension D3 is greater than the second cross sectional dimension D2. In some embodiments, the neck 144 may have a cylindric shape or may be cylinder with a diameter D3. A clearance G is formed in the neck 144 and a wall 137 forming the hole 122, such that the neck 144 is slidable in the hole 122 relative to the support bracket 126. That is, the neck 144 or the bottom support 140 is slidably connected to the support bracket 126 such that the support bracket 126 can move at a height direction H of the neck 144.

In some embodiments, the clearance G may have different sizes, for example, about 0.1 mm, 0.2 mm, 0.3 mm, 0.4 mm, 0.5 mm, or 0.7 mm, or any one in range of about 0.2 mm to about 0.5 mm. Further, the clearance G may be configured to enable the upper surface 136 of the support bracket and/or the upper surface 135 of the magnet 128 form a predetermined angle A relative to the upper surface 148 of the bottom support 140 (see FIG. 5). As the upper surfaces 135, 136 of the magnetic connector 120 can form the angle A with the bottom surface of the bottom support 140, the magnetic fastener 100 can connect the first and second vehicle parts 110, 130 with the angle A between their surfaces.

Figure 5:
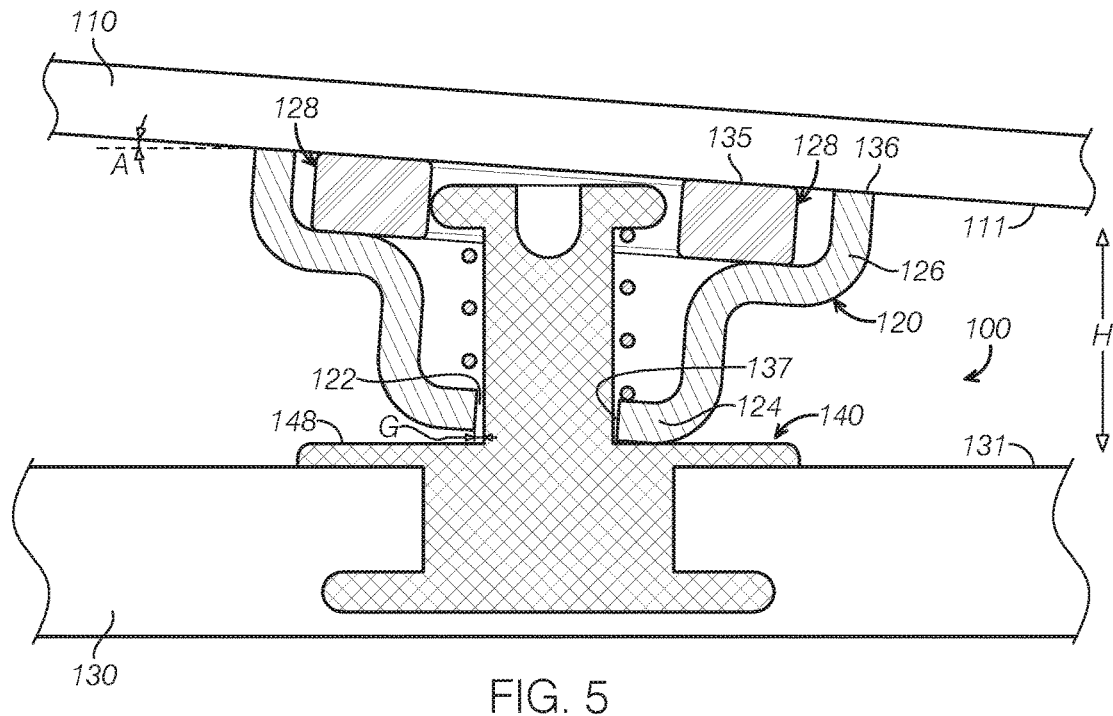
FIG. 5 is a cross sectional of the magnetic fastener shown in FIG. 2, illustrating the magnetic fastener at an offset position.

At a normal situation, the upper surface 136 of the support bracket 126 is parallel to the upper surface 148 of the bottom support 140 as shown in FIG. 4. At an offset position as shown in FIG. 5, the upper surface 136 of the support bracket 126 and the upper surface 148 of the bottom support 140 may form an angle of A. In some embodiment, the upper surface 136 of the support bracket 126 and the upper surface 148 of the bottom support 140 may not be parallel each other and may have angle B such as 15 degrees at the normal state. At the offset state, the upper surface 136 of the support bracket 126 and the upper surface 148 of the bottom support 140 may form an angle of B+A (e.g., 15+A). As described below with FIG. 5, the magnetic fastener of the present disclosure can connect the vehicle parts with surfaces having certain angles. For the illustration purpose, the upper surface 148 of the bottom support 140 is shown to be a flat surface. In other embodiments, the upper surface may have a curved surface or other uneven surfaces.

Continuing FIG. 2, the magnetic fastener 100 may further include an elastic member 160. In one embodiment, the elastic member 160 is a spring. For example, the elastic member 160 may be a spiral spring and disposed around the neck 144. Such configuration allows the spring 160 to apply uniform spring force between the bottom support 140 and the magnetic connector 120. That is, the support bracket 126 and the bottom support 140 is connected via the spring. In other embodiments, the elastic member may be a leaf spring. In some embodiments, a plurality of springs may be used to connect the support bracket 126 and neck 144.

The elastic member 160 may include a first end 162 and a second end 164. The first end 162 is connected to the neck 144. In some embodiments, the first end 162 may be connected to the distal end of the neck 144. For example, the first end 162 may be rested on or contact the stop 146. In another example the neck 144 may include a notch (not showing) at its outer surface adjacent to the distal end and the first end 162 of the elastic member 160 is received in the notch to be connected to the neck 144. The second end 164 of the elastic member 160 may be connected to the support bracket 126, or the bottom 124 of the support bracket 126. In other words, the elastic member 160 is disposed inside the support bracket 126, and extends along a height direction H of the neck 144.

FIGS. 2, 4, and 5 show that the magnetic fastener connects the first vehicle part 110 and second vehicle part 130 at different positions. Referring to FIG. 2, the magnetic fastener 100 is disposed between the first vehicle part 110 and second vehicle part 130 to connect the first and second vehicle parts 110, 130. FIG. 2 shows a desired space H1 between the lower surface 111 of the first vehicle part 110 and the upper surface 131 of the second vehicle part 130. The upper surface 136 of the support bracket 126 of the magnetic connector 120 match and contacts the lower surface 111 of the first vehicle part 100, and the lower surface of bottom 124 of the support bracket 126 rests on the upper surface 148 of the base 142. At this position, the first vehicle part 110 and the second vehicle part 130 are kept apart and prevent to be moved closer each other under an outside force. Meanwhile, an elastic member may be configured to have a proper elasticity coefficient control a distance between the support bracket 126 and the bottom support 140 to prevent the second vehicle part 130 from sliding down relative to the first vehicle part 110 under the gravity. Thus, the first vehicle part 110 and the second vehicle part 130 can be firmly connected by the magnetic fastener 100.

Referring to FIG. 4, the magnetic fastener 100 is connected between the first vehicle part 110 and the second vehicle 130. Due to tolerance in the manufacturing process, a distance H2 between the lower surface 111 of the first vehicle part 110 and the upper surface 131 of the second vehicle part 130 is larger compared to the condition in FIG. 2, that is H2>H1. During assembling, the magnetic field of the magnet 128 connects the magnetic fastener 100 and the first vehicle part 110. The support bracket 126 slides along the neck 144 such that the magnet fastener 100 extends or is lengthened at the height direction H. At this position, the spring 160 of the magnetic fastener 100 is at a compressed position. The upper surface 136 of the support bracket 126 and the upper surface 135 of the magnet 128 are connected to the lower surface 111 of the first vehicle 110 via a magnetic field and maintained contact with the lower surface 111 while the base 142 keeps a connection with the second vehicle part 130. Comparing to the application in FIG. 2, the neck 144 slides down in the hole 122 of the support bracket 126, and the elastic member 160 is compressed to increase a distance between the upper surface 136 of the support bracket 126 and the base 142 to accommodate the greater distance H2 in the first vehicle part 110 and the second vehicle part 130.

Referring to FIG. 5, the magnetic fastener 100 is connected between the first vehicle part 110 and the second vehicle part 130. Due a manufacturing tolerance, the lower surface 111 of the first vehicle part 110 and the upper surface 131 of the second vehicle part 130 or the main surface of the base 142 are not parallel. The magnetic fastener 100 is at an offset position. The upper surface 136 of the support bracket 126 and the upper surface 135 of the magnet 128 connect with the lower surface 111 of the first vehicle part 110 via the magnetic field and substantially contacts the lower surface 131. As the wall 137 of the hole 122 of the support bracket 126 has a clearance G relative to the neck 144, the support bracket 126 is tilted relative to the base 140 to be at the offset position to accommodate the un-parallel surfaces (i.e., the lower surface 111 of the first vehicle part 110 and the upper surface 131 of the second vehicle part 130).

For simplicity, the upper surface 131 of the second vehicle part 130 is shown to be parallel with main surface or upper surface of the base 140. It should be understood that the upper surface 131 may have an angle to the main surface of the base.

According to one or more embodiments, the magnetic support bracket of the magnetic fastener is moveably connected with the bottom support and a clearance is provided between a connection of the magnetic support bracket and the base. Such configuration enables the magnetic fastener to be used to connect two parts with different space in-between and the parts with nonparallel surfaces. Further, such configuration and the elastic member provides a dynamic equilibrium when connecting two parts with different spaces in-between and two parts with nonparallel surfaces.

As described in the embodiments, this invention provides a magnetic fastener. It should be understood that these embodiments can be specifically made in variations, modifications, or changes without departing from the scope of the invention as defined by the appendant claims.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A magnetic fastener, comprising:
a magnetic connector, wherein the magnetic connector includes a support bracket having a hole at a bottom;
a bottom support to hold the magnetic connector, wherein the bottom support includes a base and a neck extending from the base, wherein the neck has a distal end spaced away from the base and is partially received in the support bracket; and
an elastic member disposed inside the support bracket and extending at a height direction of the neck, wherein a first end of the elastic member is connected to the distal end of the neck and a second end of the spring is connected to the support bracket,
wherein the support bracket is moveable along the height direction of the neck.

2. The magnetic fastener of claim 1, wherein the elastic member is a spring and is disposed inside the support bracket.

3. The magnetic fastener of claim 1, wherein the neck includes a stop at the distal end, and wherein the first end of the elastic member is connected to the stop.

4. The magnetic fastener of claim 3, wherein the stop extends radially from the neck and has a first cross-sectional dimension and wherein the hole of the support bracket has a second cross-sectional dimension less than the first cross-sectional dimension of the stop.

5. The magnetic fastener of claim 1, wherein a wall of the hole of the support bracket has a clearance relative to the neck of the bottom support.

6. The magnetic fastener of claim 5, wherein the clearance is in a range of about 0.2 mm to about 0.5 mm.

7. The magnetic fastener of claim 1, wherien the support bracket is made from a permanent magnet.

8. The magnetic fastener of claim 1, wherein the support bracket is made from ferromagnetic material and wherein the magnetic connector further includes a permanent magnet positioned on the support bracket.

9. The magnetic fastener of claim 8, wherein the permanent magnet includes a central hole to receive the neck of the bottom support.

10. A magnetic fastener, comprising:
a magnet;
a ferromagnetic support bracket to hold the magnet, wherein the support bracket includes a hole at a bottom;
a bottom support including a neck, wherein the neck extends through the hole of the support bracket, is slidable in the hole, and includes a stop disposed inside the support bracket; and
a spring disposed between the stop of the bottom support and the bottom of the support bracket along an extending direction of the neck, wherein a first end of the spring is connected to the stop and a second end of the spring is connected to the bottom of the support bracket.

11. The magnetic fastener of claim 10, wherein a wall forming the hole of the support bracket has a clearance relative to the neck.

12. The magnetic fastener of claim 11, wherein the support bracket has a bowl shape.

13. A magnetic fastener in a vehicle, comprising:
a magnet;
a support bracket to hold the magnet, wherein the support bracket has a hole at a bottom and an upper surface of the support bracket or an upper surface of the magnet is to be connected to a first vehicle part;
a bottom support including a base to be connected to a second vehicle part and a neck extending from the base, wherein the neck has a distal end spaced away from the base and is partially received in the support bracket; and
a spring disposed inside the support bracket and extending at a height direction of the neck, wherein a first end of the spring is connected to the distal end of the neck and a second end of the spring is connected to the support bracket;
wherein the support bracket is moveable along the height direction of the neck.

14. The magnetic fastener of claim 13, wherein a wall defining the hole of the support bracket has a clearance to an outer edge of the neck, and wherein the clearance is configured such that the upper surface of the support bracket or the upper surface of the magnet is capable of being inclined to a predetermined angle relative to an upper surface of the bottom support.

15. The magnetic fastener of claim 14, wherein the support bracket includes a magnet holding portion and a receiving portion between the magnet holding portion and the base of the bottom support, wherein at least a portion of the spring and a portion of the neck is disposed in the receiving portion, and wherein a cross sectional area of an opening of the magnet holding portion is greater than a cross sectional area of an opening of the receiving portion.

16. The magnetic fastener of claim 15, wherein the openings of the magnet holding portion and the receiving portion are circular, and the neck has a cylinder shape.

17. The magnetic fastener of claim 16, wherein a distal end of the neck includes a stop extending radially from the neck.

18. The magnetic fastener of claim 13, wherein the spring is a spiral spring and the neck is positioned inside the spring.

19. The magnetic fastener of claim 12, wherein the first vehicle part is a roof panel and the second vehicle part is a headliner.

* * * * *